US012236407B2

(12) United States Patent
Jayaraman

(10) Patent No.: US 12,236,407 B2
(45) Date of Patent: Feb. 25, 2025

(54) CHAT SUPPORT PLATFORM FOR IDENTIFICATION AND AUTOMATION OF RECURRING FINANCIAL TRANSACTIONS ON USER COMMAND

(71) Applicant: Truist Bank, Charlotte, NC (US)

(72) Inventor: Barath Jayaraman, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 70 days.

(21) Appl. No.: 18/180,740

(22) Filed: Mar. 8, 2023

(65) Prior Publication Data
US 2024/0303616 A1    Sep. 12, 2024

(51) Int. Cl.
*G06Q 20/10* (2012.01)
*H04L 51/02* (2022.01)

(52) U.S. Cl.
CPC ........... *G06Q 20/102* (2013.01); *H04L 51/02* (2013.01)

(58) Field of Classification Search
USPC .......................................................... 705/39
See application file for complete search history.

(56) References Cited

U.S. PATENT DOCUMENTS

| 10,630,840 B1* | 4/2020 | Karp et al. ......... H04M 3/5166 |
| 10,769,631 B2* | 9/2020 | Hayes et al. ....... G06Q 20/4014 |
| 2008/0177659 A1* | 7/2008 | Lacey et al. ..................... 705/42 |
| 2016/0335532 A1* | 11/2016 | Sanghavi et al. ...... G06N 3/006 |
| 2017/0068952 A1* | 3/2017 | Brockmann et al. ........ G06Q 20/363 |
| 2020/0043089 A1* | 2/2020 | Murray .................. G06Q 40/02 |
| 2020/0219103 A1* | 7/2020 | Mandloi ............ G06Q 40/4012 |
| 2021/0303331 A1* | 9/2021 | Martin-Bale et al. ...... G06F 9/45558 |
| 2021/0314282 A1* | 10/2021 | Sharma ................... H04L 51/02 |
| 2022/0147967 A1* | 5/2022 | Clark ..................... G06Q 20/22 |

OTHER PUBLICATIONS

Gopal Vishwas Patil et al., Research and Analysis on Voice Based System with Machine Learning, Apr. 22, 2022, 2022 10th International Conference on Emerging Trends in Engineering and Technology—Signal and Information Processing, pp. 1-4. (Year: 2022).*

* cited by examiner

*Primary Examiner* — Scott C Anderson
*Assistant Examiner* — George N. Proios
(74) *Attorney, Agent, or Firm* — Jordan IP Law, LLC; Michael A. Springs, Esq.

(57) ABSTRACT

A computing device, a computer program product, and a computer-implemented method for delivering enhanced financial services and, more particularly, for facilitating automation of recurring financial transactions. A user can have one or more financial transactions saved on command in order to have them executed at any point in time.

14 Claims, 14 Drawing Sheets

CHAT SUPPORT PLATFORM FOR IDENTIFICATION AND AUTOMATION OF RECURRING FINANCIAL TRANSACTIONS ON USER COMMAND

TECHNICAL FIELD

The present disclosure relates to a computing device, computer program product, and computer-implemented method for delivering digital financial services and, more particularly, for a chat support platform that facilitates automation of recurring transactions.

BACKGROUND

Financial institutions that provide financial services are increasingly providing a greater number of client services. In order to alleviate call and chat density from customers over a network environment, such client services include automated virtual support agents (e.g., chatbots) who supplement human virtual support agents by directly interacting with customers via text chat, phone, instant messaging, etc.

SUMMARY

The present disclosure relates to a computing device, a computer program product, and a computer-implemented method for delivering enhanced digital financial services over a communication network by providing a digital financial management platform for a client device that includes a virtual chat communication platform that facilitates an enhanced user chat experience. The chat support platform facilitates a more enhanced chat experience by enabling a user to automate, contemporaneously with a virtual chat communication session, one or more recurring financial transactions. The user may transmit a command to the virtual support agent to execute a one or more financial transactions (e.g., a bill payment, a transfer of funds between financial accounts of the user, etc.) contemporaneously with the virtual chat communication session. The virtual chat communication platform may also identify recurring financial transactions made by the user, and in response thereto, prompt the user whether to classify the identified recurring financial transaction as a recurring financial transaction to be executed automatically on a predetermined time period.

In accordance with one or more embodiments set forth, illustrated and described herein, an apparatus comprises one or more processors; and a non-transitory memory coupled to the one or more processors, the non-transitory memory including a set of instructions of computer-executable program code, which when executed by the one or more processors, causes the apparatus to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a command to execute a financial transaction on behalf of the user using funds from a source financial account of the user that is maintained by the financial institution, the financial transaction including transaction details; and execute, in response to the command to execute the financial transaction and contemporaneously with the virtual chat communication session, the financial transaction using the transaction details.

In accordance with one or more embodiments set forth, illustrated and described herein, an apparatus comprises one or more processors; and a non-transitory memory coupled to the one or more processors, the non-transitory memory including a set of instructions of computer-executable program code, which when executed by the one or more processors, causes the apparatus to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a first command to execute a financial transaction comprising transaction details; execute, in response to the first command, the financial transaction using the transaction details; receive, from the client device contemporaneously with the virtual chat communication session, a second command to save the transaction details and save a user-designated name associated with the transaction details; save, in response to the second command, the transaction details and the user-designated name; receive, from the client device contemporaneously with the virtual chat communication session, a third command to execute the financial transaction using the user-designated name; and execute, in response to the third command, the financial transaction associated with the user-designated name using the transaction details.

In accordance with each respective apparatus, the set of instructions, which when executed by the one or more processors, causes the apparatus to receive, from the client device contemporaneously with the virtual chat communication session, a second command from the user to save a user-designated name associated with the financial transaction and classify the financial transaction as a recurring financial transaction to be executed automatically on a predetermined time period using the user-designated name and the transaction details.

In accordance with each respective apparatus, the set of instructions, which when executed by the one or more processors, causes the apparatus to save, in response to the second command, save the user-designated name and classify the financial transaction as the recurring financial transaction.

In accordance with each respective apparatus, the set of instructions, which when executed by the one or more processors, causes the apparatus to execute the financial transaction using the online bill payment system of the financial institution.

In accordance with each respective apparatus, the set of instructions, which when executed by the one or more processors, causes the apparatus to automatically populate input fields of the online bill payment system using the transaction details.

In accordance with each respective apparatus, the transaction details comprises one or more of: an amount of the financial transaction, the source financial account of the user, a payee, and a date the transaction should be completed.

In accordance with each respective apparatus, the set of instructions, which when executed by the one or more processors, causes the apparatus to visually display, on a user interface of the client device contemporaneously with the virtual chat communication session, all saved financial transaction details and their respective names.

In accordance with each respective apparatus, the set of instructions, which when executed by the one or more processors, causes the apparatus to identify, contemporaneously with the virtual chat communication session, a recurring financial transaction by the user from a source financial account that is maintained by the financial institution.

In accordance with each respective apparatus, the set of instructions, which when executed by the one or more processors, causes the apparatus to transmit, contemporaneously with the virtual chat communication session, a message to the client device prompting the user whether to classify the identified financial transaction as a recurring financial transaction to be executed automatically on a predetermined time period.

In accordance with each respective apparatus, wherein each command from the user comprises an audible speech command.

In accordance with each respective apparatus, the set of instructions, which when executed by the one or more processors, cause the apparatus to transmit, to the client device in response to executing the financial transaction, an electronic notification of the financial transaction.

In accordance with each respective apparatus, the electronic notification includes a time stamp indicating when the financial transaction was completed.

In accordance with each respective apparatus, the electronic notification comprises a text message.

In accordance with each respective apparatus, the electronic notification comprises a chat message in a chat window associated with the virtual chat communication session.

In accordance with one or more embodiments set forth, illustrated and described herein, a computer program product comprising at least one non-transitory computer readable medium having with a set of instructions of computer-executable program code, which when executed by one or more processors of a computing device, causes the computing device to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a command to execute a financial transaction on behalf of the user using funds from a source financial account of the user that is maintained by the financial institution, the financial transaction including transaction details; and execute, in response to the command to execute the financial transaction and contemporaneously with the virtual chat communication session, the financial transaction using the transaction details.

In accordance with one or more embodiments set forth, illustrated and described herein, a computer program product comprising at least one non-transitory computer readable medium having with a set of instructions of computer-executable program code, which when executed by one or more processors of a computing device, causes the computing device to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a first command to execute a financial transaction comprising transaction details; execute, in response to the first command, the financial transaction using the transaction details; receive, from the client device contemporaneously with the virtual chat communication session, a second command to save the transaction details and save a user-designated name associated with the transaction details; save, in response to the second command, the transaction details and the user-designated name; receive, from the client device contemporaneously with the virtual chat communication session, a third command to execute the financial transaction using the user-designated name; and execute, in response to the third command, the financial transaction associated with the user-designated name using the transaction details.

In accordance with each respective computer program product, the set of instructions, which when executed by the one or more processors, causes the computing device to receive, from the client device contemporaneously with the virtual chat communication session, a second command from the user to save a user-designated name associated with the financial transaction and classify the financial transaction as a recurring financial transaction to be executed automatically on a predetermined time period using the user-designated name and the transaction details.

In accordance with each respective computer program product, the set of instructions, which when executed by the one or more processors, causes the computing device to save, in response to the second command, save the user-designated name and classify the financial transaction as the recurring financial transaction.

In accordance with each respective computer program product, the set of instructions, which when executed by the one or more processors, causes the computing device to execute the financial transaction using the online bill payment system of the financial institution.

In accordance with each respective computer program product, the set of instructions, which when executed by the one or more processors, causes the computing device to automatically populate input fields of the online bill payment system using the transaction details.

In accordance with each respective computer program product, the transaction details comprises one or more of: an amount of the financial transaction, the source financial account of the user, a payee, and a date the transaction should be completed.

In accordance with each respective computer program product, the set of instructions, which when executed by the one or more processors, causes the computing device to visually display, on a user interface of the client device contemporaneously with the virtual chat communication session, all saved financial transaction details and their respective names.

In accordance with each respective computer program product, the set of instructions, which when executed by the one or more processors, causes the computing device to identify, contemporaneously with the virtual chat communication session, a recurring financial transaction by the user from a source financial account that is maintained by the financial institution.

In accordance with each respective computer program product, the set of instructions, which when executed by the one or more processors, causes the computing device to transmit, contemporaneously with the virtual chat communication session, a message to the client device prompting the user whether to classify the identified financial transaction as a recurring financial transaction to be executed automatically on a predetermined time period.

In accordance with each respective computer program product, each command from the user comprises an audible speech command.

In accordance with each respective computer program product, the set of instructions, which when executed by the one or more processors, cause the computing device to transmit, to the client device in response to executing the financial transaction, an electronic notification of the financial transaction.

In accordance with each respective computer program product, the electronic notification includes a time stamp indicating when the deletion was completed.

In accordance with each respective computer program product, the electronic notification comprises a text message.

In accordance with each respective computer program product, the electronic notification comprises a chat message in a chat window associated with the virtual chat communication session.

In accordance with one or more embodiments illustrated, set forth, and described herein, a computer-implemented method comprises: causing, by one or more financial institution servers associated with a financial institution during execution of a mobile application or desktop application associated with a financial institution by a client device of a user over a communication network, a visual display of a first chat interface on the client device to facilitate a virtual chat communication session between the user and a virtual support agent of the financial institution; receiving, by the one or more financial institution servers from the client device contemporaneously with the virtual chat communication session, a command to execute a financial transaction on behalf of the user using funds from a source financial account of the user that is maintained by the financial institution, the financial transaction including transaction details; and executing, by the one or more financial institution servers in response to the command to execute the financial transaction and contemporaneously with the virtual chat communication session, the financial transaction using the transaction details.

In accordance with one or more embodiments illustrated, set forth, and described herein, a computer-implemented method comprises: causing, by one or more financial institution servers associated with a financial institution during execution of a mobile application or desktop application associated with a financial institution by a client device of a user over a communication network, a visual display of a chat interface on the client device to facilitate a virtual chat communication session between the user and a first virtual support agent of the financial institution; receiving, by the one or more financial institution servers from the client device contemporaneously with the virtual chat communication session, a first command to execute a financial transaction comprising transaction details; executing, by the one or more financial institution servers in response to the first command, the financial transaction using the transaction details; receiving, by the one or more financial institution servers from the client device contemporaneously with the virtual chat communication session, a second command to save the transaction details and save a user-designated name associated with the transaction details; saving, by the one or more financial institution servers in response to the second command, the transaction details and the user-designated name; receiving, by the one or more financial institution servers from the client device contemporaneously with the virtual chat communication session, a third command to execute the financial transaction using the user-designated name; and executing, by the one or more financial institution servers in response to the third command, the financial transaction associated with the user-designated name using the transaction details.

In accordance with each respective computer-implemented method, further comprising receiving, by the one or more financial institution servers from the client device contemporaneously with the virtual chat communication session, a second command from the user to save a user-designated name associated with the financial transaction and classify the financial transaction as a recurring financial transaction to be executed automatically on a predetermined time period using the user-designated name and the transaction details.

In accordance with each respective computer-implemented method, further comprising saving, by the one or more financial institution servers in response to the second command, save the user-designated name and classify the financial transaction as the recurring financial transaction.

In accordance with each respective computer-implemented method, further comprising executing, by the one or more financial institution servers, the financial transaction using the online bill payment system of the financial institution.

In accordance with each respective computer-implemented method, further comprising automatically populating, by the one or more financial institution servers, input fields of the online bill payment system using the transaction details.

In accordance with each respective computer-implemented method, the transaction details comprises one or more of: an amount of the financial transaction, the source financial account of the user, a payee, and a date the transaction should be completed.

In accordance with each respective computer-implemented method, further comprising identifying, by the one or more financial institution servers contemporaneously with the virtual chat communication session, a recurring financial transaction by the user from a source financial account that is maintained by the financial institution.

In accordance with each respective computer-implemented method, further comprising transmitting, by the one or more financial institution servers contemporaneously with the virtual chat communication session, a message to the client device prompting the user whether to classify the identified financial transaction as a recurring financial transaction to be executed automatically on a predetermined time period.

In accordance with each respective computer-implemented method, each command from the user comprises an audible speech command.

In accordance with each respective computer-implemented method, further comprising transmitting, by the one or more financial institution servers to the client device in response to executing the financial transaction, an electronic notification of the financial transaction.

In accordance with each respective computer-implemented method, the electronic notification includes a time stamp indicating when the deletion was completed.

In accordance with each respective computer-implemented method, the electronic notification comprises a text message.

In accordance with each respective computer-implemented method, the electronic notification comprises a chat message in a chat window associated with the virtual chat communication session.

DRAWINGS

The various advantages of the exemplary embodiments will become apparent to one skilled in the art by reading the following specification and appended claims, and by referencing the following drawings, in which:

DESCRIPTION

Figure 1:
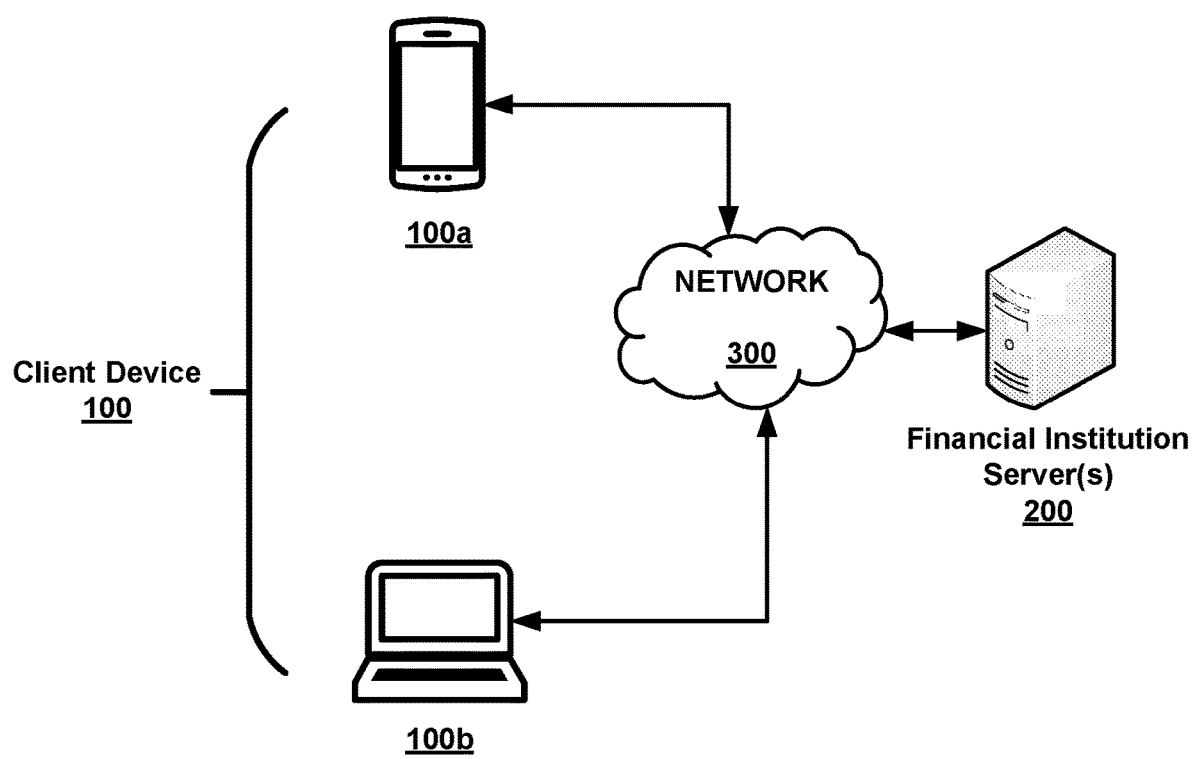
FIG. 1 illustrates a communication environment, in accordance with one or more embodiments set forth and described herein.

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to execute a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code executing on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a virtual chat communication platform is provided for a client device of a user having one or more financial accounts residing at one or more financial institution servers of a financial institution. The virtual chat communication platform enables a single user, using a single client device, to participate in multiple simultaneous virtual chat communication sessions with virtual support agents acting on behalf of the financial institution in support of serving the needs of the user. In that way, the user is not forced to cancel or end a first virtual chat communication session in order to commence two or more additional virtual chat communication sessions using the same client device.

Turning to the figures, in which FIG. 1 illustrates a communication environment that facilitates communications between a user and a financial institution. A client device 100 of a user (financial account holder) operating in the communication environment facilitates user access to and user management of one or more financial accounts residing at one or more financial institution servers 200 of the financial institution. The communication environment includes the client device 100, the one or more financial institution servers 200, and a communication network 300 through which communication is facilitated between the client device 100 and the one or more financial institution servers 200.

In accordance with one or more embodiments set forth, described, and/or illustrated herein, the client device 100 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the client device 100 comprising any form of electronic device that optimizes or otherwise transforms the performance and functionality of the one or more embodiments in a manner that falls within the spirit and scope of the principles of this disclosure.

Figure 2:
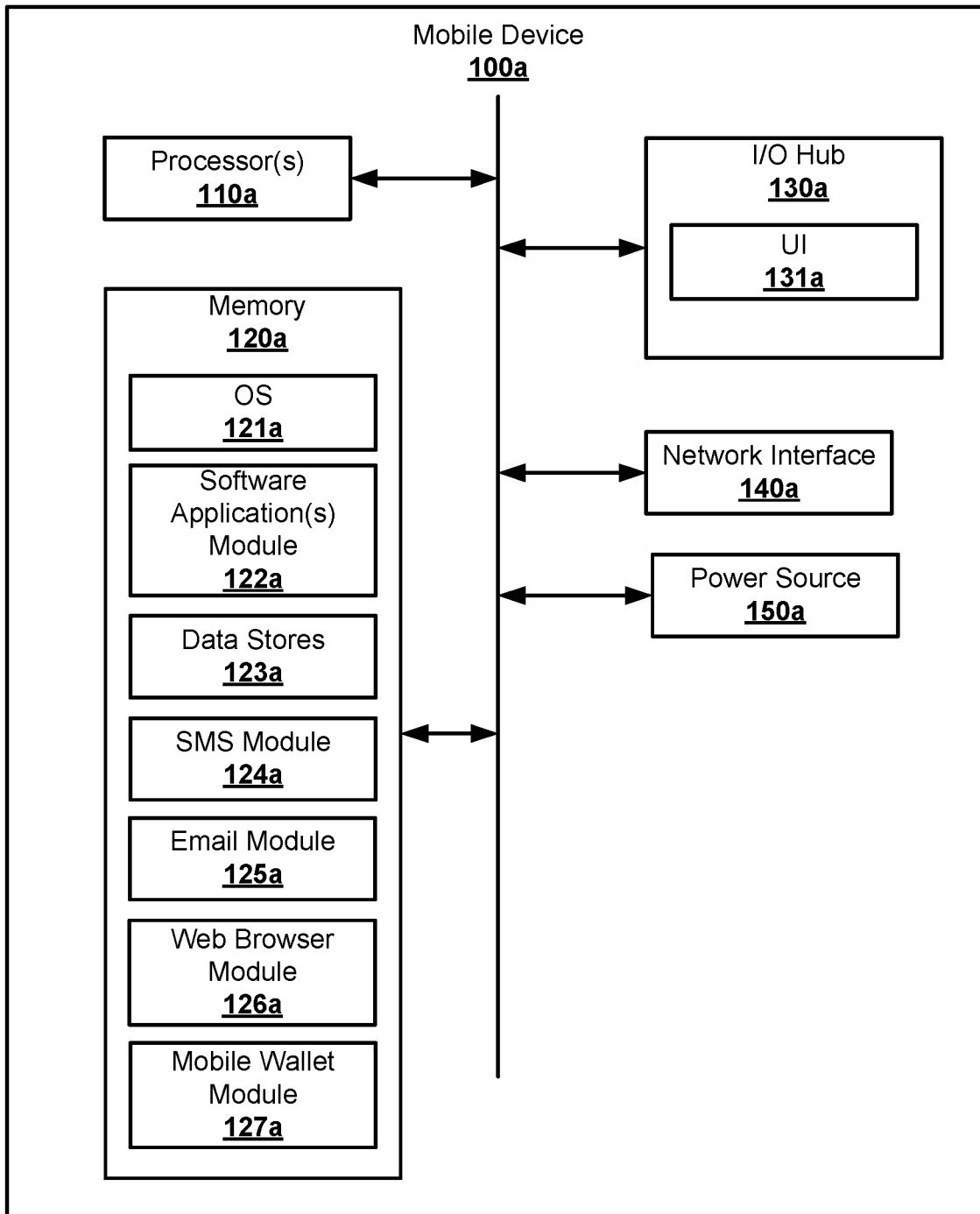
FIG. 2 illustrates a block diagram of the first client device of FIG. 1.

In the illustrated example embodiment of FIG. 2, the client device 100 comprises a mobile device 100a. Some of the possible operational elements of the mobile device 100a are illustrated in FIG. 2 and will now be described herein. It will be understood that it is not necessary for the mobile device 100a to have all the elements illustrated in FIG. 2. For example, the mobile device 100a may have any combination of the various elements illustrated in FIG. 2. Moreover, the mobile device 100a may have additional elements to those illustrated in FIG. 2.

The mobile device 100a includes one or more processors 110a, a non-transitory memory 120a operatively coupled to the one or more processors 110a, an I/O hub 130a, a network interface 140a, and a power source 150a.

The memory 120a comprises a set of instructions of computer-executable program code. The set of instructions are executable by the one or more processors 110a to cause execution of an operating system 121a and one or more software applications of a software application module 122a that reside in the memory 120a. The one or more software applications residing in the memory 120a includes, but is not limited to, a financial institution application that is associated with the financial institution. The financial institution application comprises a mobile application or desktop application that facilitates establishment of a secure connection between the mobile device 100a and the one or more financial institution servers 200. The one or more processors 110a are operable to execute the mobile application or desktop application to facilitate user access to the one or more financial accounts and user management of the one or more financial accounts.

The memory 120a also includes one or more data stores 123a that are operable to store one or more types of data. The mobile device 100a may include one or more interfaces that facilitate one or more systems or modules thereof to transform, manage, retrieve, modify, add, or delete, the data residing in the data stores 123a. The one or more data stores 123a may comprise volatile and/or non-volatile memory. Examples of suitable data stores 123a include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123a may be a component of the one or more processors 110a or alternatively, may be operatively connected to the one or more processors 110a for use thereby. As set forth, described, and/or illustrated herein, "operatively connected" may include direct or indirect connections, including connections without direct physical contact.

The memory 120a also includes an SMS module 124a operable to facilitate user transmission and receipt of text messages via the mobile device 100a though the network 300. In one example embodiment, the user may receive text messages from the financial institution that are associated with the user access and the user management of the one or more financial accounts. An email module 125a is operable to facilitate user transmission and receipt of email messages via the mobile device 100a through the network 300. In one example embodiment, the user may receive email messages from the financial institution that are associated with the user access and the user management of the one or more financial accounts. The user may utilize a web browser module 126a that is operable to facilitate user access to one or more websites associated with the financial institution through the network 300. A digital wallet module 127a facilitates the generation of one or more digital wallets associated with the one or more financial accounts.

In accordance with one or more embodiments set forth, described, and/or illustrated herein, the mobile device 100a includes an I/O hub 130a operatively connected to other systems and subsystems of the mobile device 100a. The I/O system 130a may include one or more of an input interface, an output interface, and a network controller to facilitate communications between the mobile device 100a and the one or more financial institution servers 200. The input interface and the output interface may be integrated as a single, unitary user interface 131a, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110a to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The mobile device 100a also includes a network interface 140a operable to facilitate connection to the network 300. The mobile device 100a further includes a power source 150a that comprises a wired powered source, a wireless power source, a replaceable battery source, or a rechargeable battery source.

Figure 3:
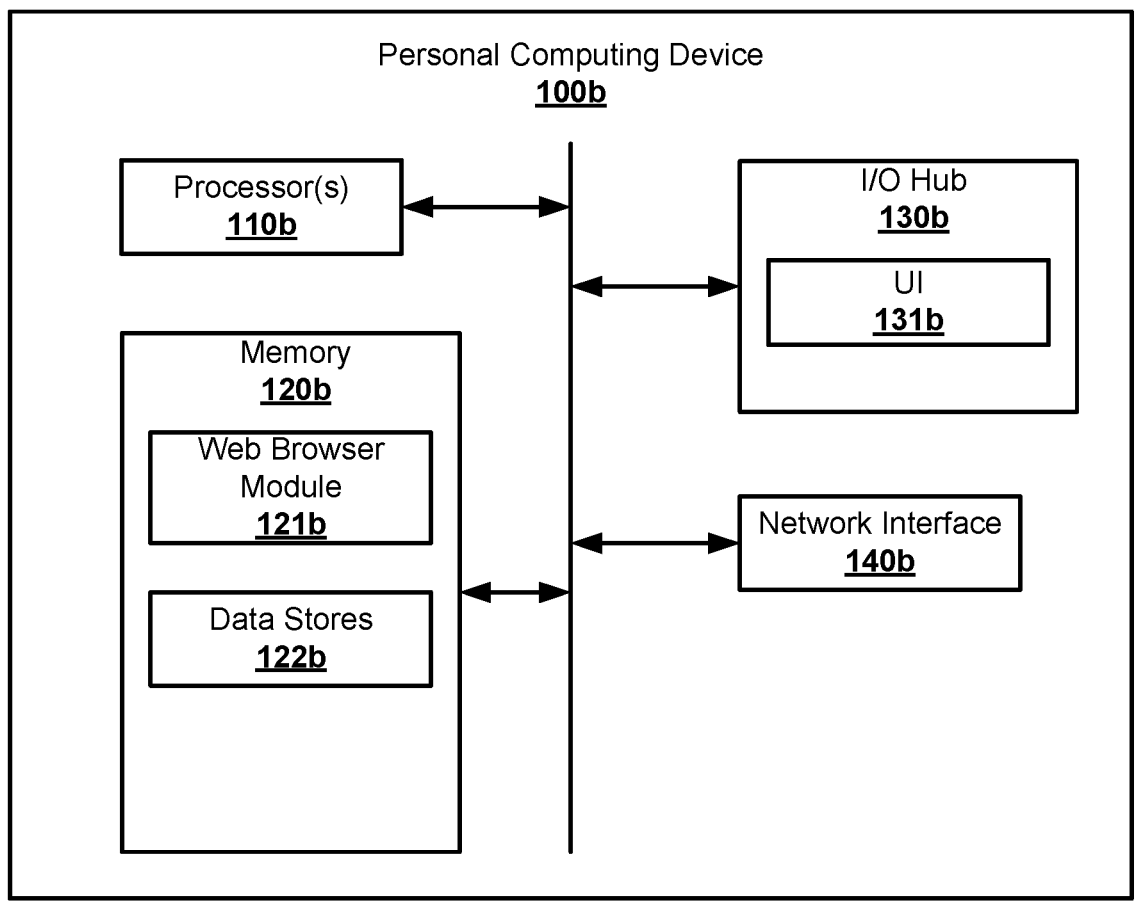
FIG. 3 illustrates a block diagram of the second client device of FIG. 1.

In the illustrated example embodiment of FIG. 3, the client device 100 comprises a personal computing device 100b. Some of the possible operational elements of the personal computing device 100b are illustrated in FIG. 3 and will now be described herein. It will be understood that it is not necessary for the personal computing device 100b to have all the elements illustrated in FIG. 3. For example, the personal computing device 100*b* may have any combination of the various elements illustrated in FIG. 3. Moreover, the personal computing device 100*b* may have additional elements to those illustrated in FIG. 3.

The personal computing device 100*b* includes one or more processors 110*b*, a non-transitory memory 120*b* operatively coupled to the one or more processors 110A, an I/O hub 130*b*, and a network interface 140*b*.

The memory 120*b* comprises a set of instructions of computer-executable program code. The set of instructions are executable by the one or more processors 110*b* to cause control of the web browser module 121*b* in a manner that facilitates user access to a web browser having one or more websites associated with the financial institution through the network 300.

The memory 120*b* also includes one or more data stores 122*b* that are operable to store one or more types of data. The personal computing device 100*b* may include one or more interfaces that facilitate one or more systems or modules thereof to transform, manage, retrieve, modify, add, or delete, the data residing in the data stores 122*b*. The one or more data stores 122*b* may comprise volatile and/or non-volatile memory. Examples of suitable data stores 122*b* include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 122*b* may be a component of the one or more processors 110*b*, or alternatively, may be operatively connected to the one or more processors 110*b* for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 100*b* may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110*b* may comprise at least one hardware circuit (e.g., an integrated circuit) operable to carry out instructions contained in program code. In embodiments in which there is a plurality of processors, such processors may work independently from each other, or one or more processors may work in combination with each other.

In accordance with one or more embodiments set forth, described, and/or illustrated herein, the personal computing device 100*a* includes an I/O hub 130*b* operatively connected to other systems and subsystems of the personal computing device 100*a*. The I/O system 130*b* may include one or more of an input interface, an output interface, and a network controller to facilitate communications between the personal computing device 100*a* and the one or more financial institution servers 200. The input interface and the output interface may be integrated as a single, unitary user interface 131*b*, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110*b* to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100*a* may serve as both a component of the input interface and a component of the output interface.

The personal computing device 100*b* also includes a network interface 140*b* operable to facilitate connection to the network 300.

Figure 4:
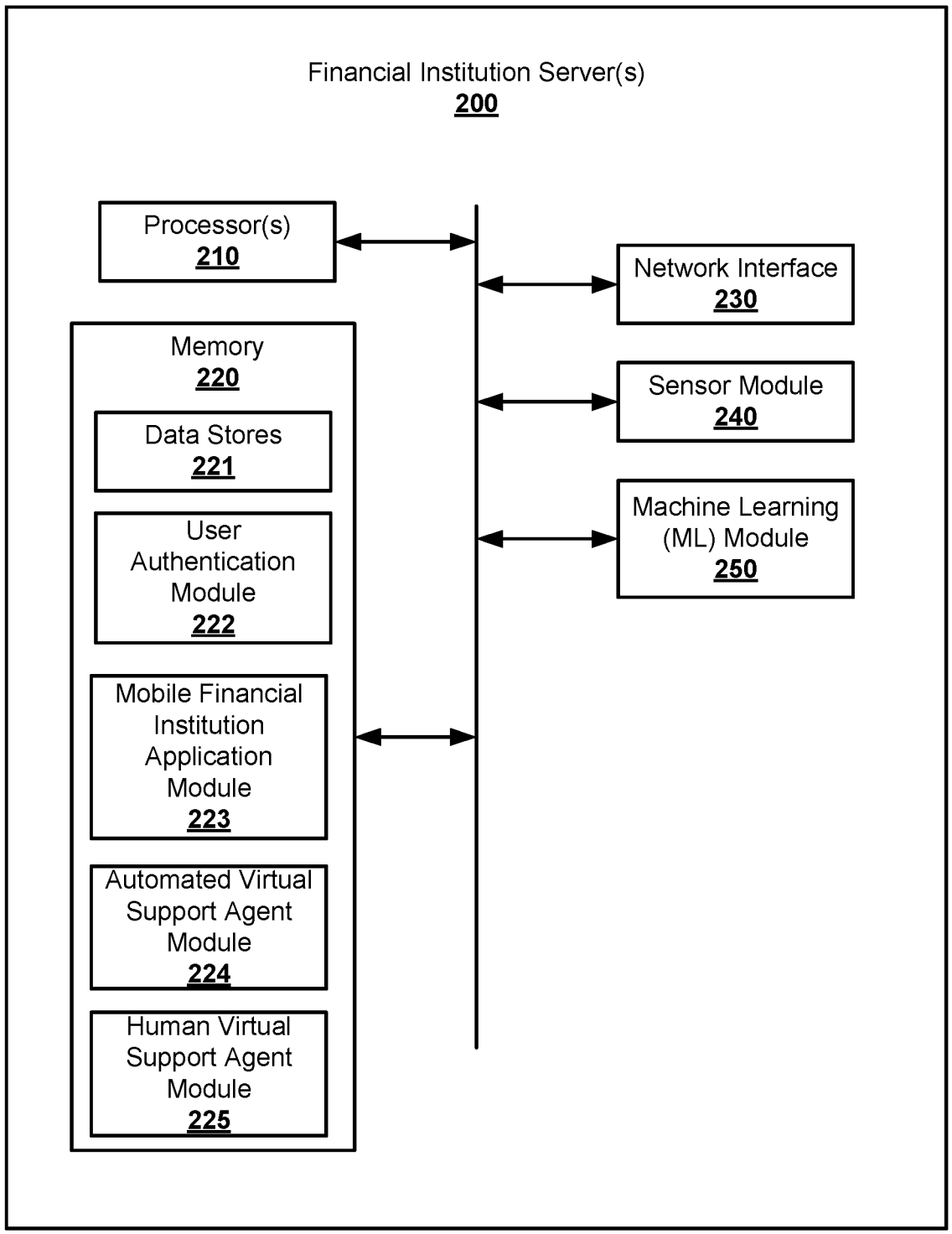
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user authentication module 222, a mobile financial institution application module 223 having one or more mobile financial institution applications that reside in the memory 220, an automated virtual support agent module 224, and a human virtual support agent module 225. In accordance with one or more embodiments set forth, described, and/or illustrated herein, the one or more financial institution servers 200 may individually or collectively execute the instructions to perform any one or more of the methodologies set forth, described, and illustrated herein.

The memory 220 also includes one or more data stores 221 that are operable to store one or more types of data, including but not limited to, user account data, user authentication data, sensor data, etc. For instance, the one or more data stores 221 may comprise a storage location on which one or more electronic files of the transcripts associated with virtual chat communications reside, and other information associated with the one or more financial accounts of the user. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the one or more financial institution servers 200 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The memory 220 can store computer readable program code and data which, when executed by the one or more processors 210 (or other processor) can execute (or cause to be implemented) any of the features and methodologies described herein.

The computer-executable program code may instruct the one or more processors 210 to cause the user authentication module 221 to authenticate a user in order to gain user access to the one or more financial accounts. The user authentication module 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 222 are operable to communicate with the first client device 100a and the second client device 100b in a manner which facilitates user access to the one or more financial accounts in addition to user management of the one or more financial accounts based on successful user authentication.

The sensor module 240 is operable, at least during execution of the mobile application or desktop application by the client device 100, to dynamically detect, determine, assess, monitor, measure, quantify, and/or sense information about the client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the client device 100.

The ML module 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the client device 100 and the one or more financial institution servers 200, while also enhancing user access and management of the one or more financial accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the client device 100, execute a mobile application or desktop application associated with the financial institution over the communication network 300.

In accordance with one or more embodiments set forth, illustrated, and described herein, a chat support platform is provided for a client device of a user having one or more financial accounts residing at one or more financial institution servers of a financial institution. The chat support platform facilitates a more enhanced chat experience by enabling a user to automate, contemporaneously with a virtual chat communication session, one or more recurring financial transactions. The user may transmit a command to the virtual support agent to execute a one or more financial transactions (e.g., a bill payment, a transfer of funds between financial accounts of the user, etc.) contemporaneously with the virtual chat communication session. The virtual chat communication platform may also identify recurring financial transactions made by the user, and in response thereto, prompt the user whether to classify the identified recurring financial transaction as a recurring financial transaction to be executed automatically on a predetermined time period.

Figure 5:
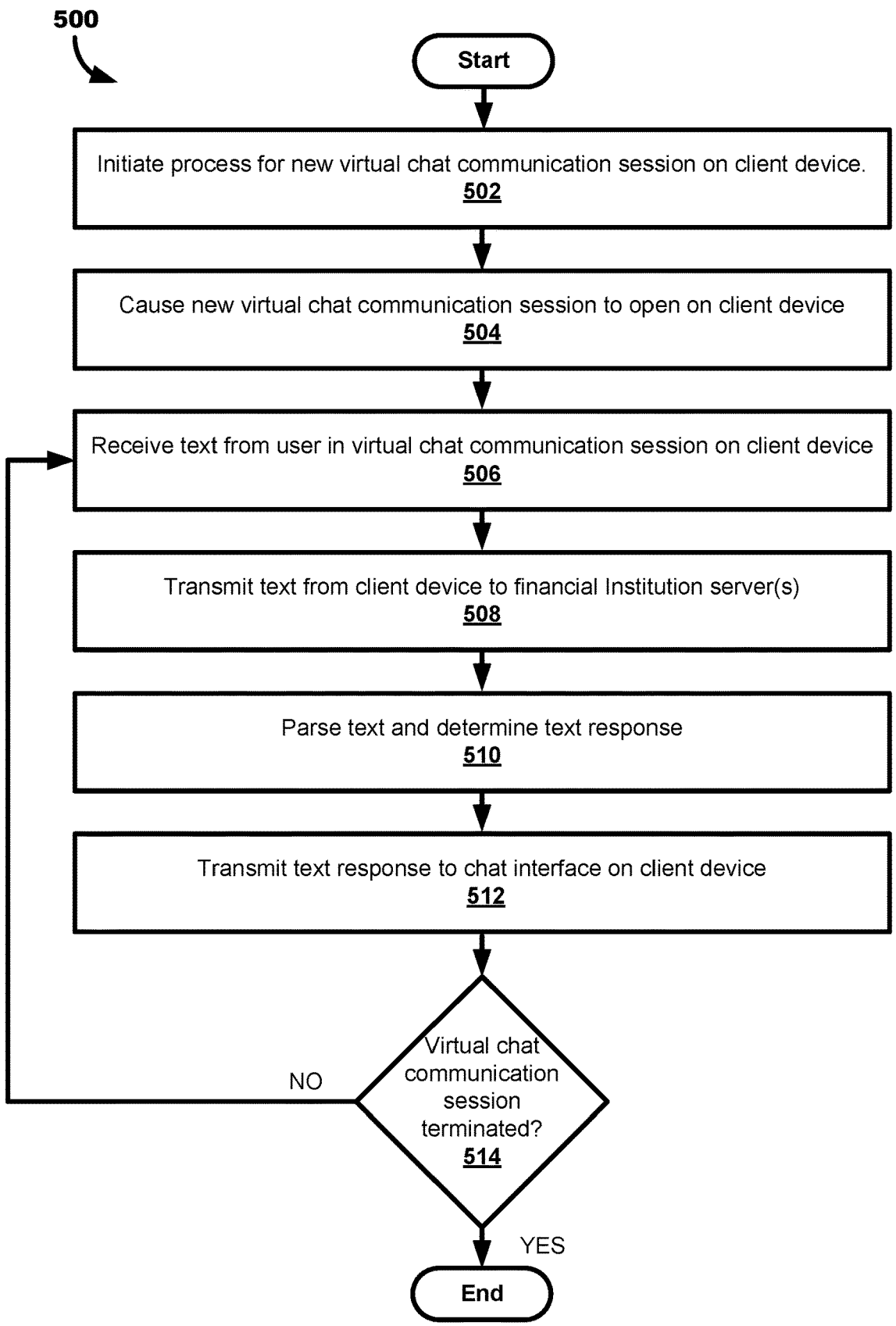
FIG. 5 illustrates a computer-implemented method for implementing a chat communication session with a virtual support agent, in accordance with one or more embodiments set forth and described herein.
Figure 6:
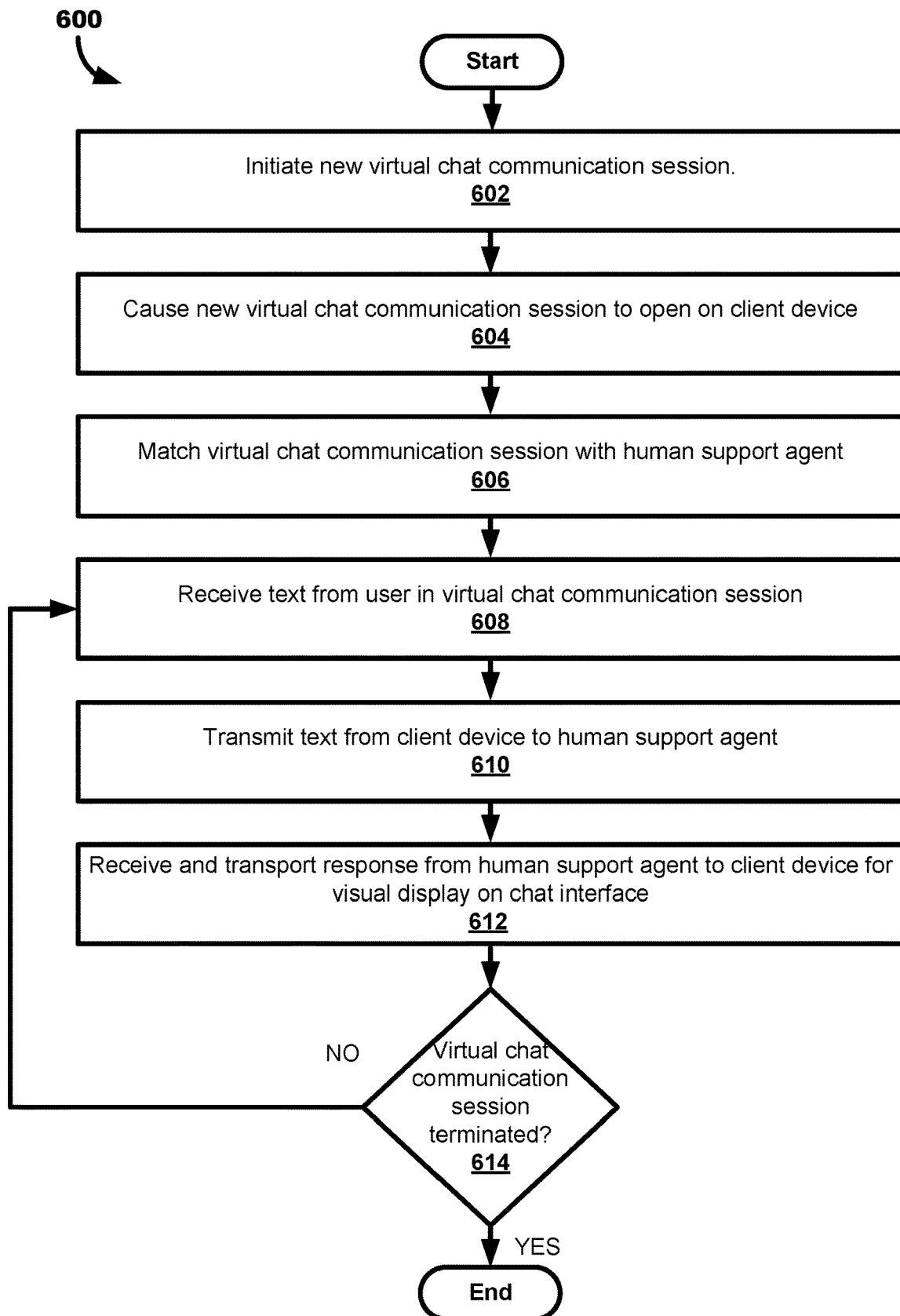
FIG. 6 illustrates a computer-implemented method for implementing a chat communication session with a human virtual support agent, in accordance with one or more embodiments set forth and described herein.

Illustrated examples shown in FIGS. 5 and 6 set forth computer-implemented methods 500 and 600. In one or more examples, the respective flowcharts of the computer-implemented methods 500 and 600 may be implemented by the one or more processors 210 of the one or more financial institution servers 200. In particular, the computer-implemented methods 500 and 600 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more financial institution servers 200 provides functionality described or illustrated herein. In particular, software executed by the one or more processors 210 is operable to perform one or more processing blocks of the computer-implemented methods 500 and 600 set forth, described, and/or illustrated herein, or provides functionality set forth, described, and/or illustrated.

As illustrated in FIG. 5, a computer-implemented method 500 implements a virtual chat communication session between a user and a virtual support agent, in accordance with one or more embodiments set forth and described herein.

Illustrated process block 502 causes the one or more processors 210 to initiate a new dedicated process in order to facilitate a new virtual chat communication session. This initiation may include such operations as allocating memory, adding the new virtual chat communication session to a chat queue (of all virtual chat communication sessions administered by the financial institution server(s) 200), and all other such tasks.

From illustrated process block 502, the computer-implemented method 500 proceeds to illustrated process block 504, which causes a new virtual chat communication session to open on the client device 100 by causing software executing on the client device 100 to display a GUI showing the new virtual chat communication session. A virtual chat communication session can be a stand-alone chat interface comprising a chat window, or a chat window superimposed over a chat widget (discussed further herein) or any GUI which functions to facilitate a virtual chat communication session between a user and a virtual support agent. The one or more processors 210 would communicate with a process executing on the client device 100 so that the process (could be an application program executing on the client device, a web browser, the operating system on the client device 100 itself, etc.) instructs the client device 100 to open the new virtual chat communication session by utilizing a GUI on the interface 131a, 131b of the client device 100.

The computer-implemented method 500 may then proceed to illustrated process block 506, which includes receiving text (typed, spoken, etc.) entered into the chat interface and visually displayed on the user interface 131a, 131b of the client device 100.

The computer-implemented method 500 may then proceed to illustrated process block 508, which transmits the text received from illustrated process block 506 to the financial institution servers(s) 200 and routed to the respective process handling the particular virtual chat communication session.

The computer-implemented method 500 may then proceed to illustrated process block 510, which includes parsing the text (typically by the one or more processors 210 of the financial institution server(s) 200) by separating the words in the text and analyzing the text (using one or more such techniques, such as a rules-based system, a machine learning model (such as a convolution neural network), natural language processing (NLP), text mining, or the like.) A response to the text is generated using the one or more such techniques, which may include querying a database in memory 220 to retrieve the response. For example, should the user provide a text query "what is my account balance," the text analyzer would analyze the text to determine that there is an unknown quantity needed (the user's account balance), and then query the one or more financial institution server(s) 200 to retrieve the quantity needed (the user's account balance).

After the response is determined, the computer-implemented method 500 may then proceed to illustrated process block 512, which then causes a visual display of the response (e.g., "Your balance is $1,000.00") on the chat interface that itself is visually displayed on the user interface 131a, 131b.

The computer-implemented method 500 may then proceed to illustrated decision block 514, which determines whether the virtual chat communication session is terminated. A number of events may result in termination of the virtual chat communication session, including, but not limited to, the user closing the chat window on the client device 100, the user communicating (textually and/or verbally) "end this chat" (or some similar phrase), a human virtual support agent manually terminating the virtual chat communication session, the lapse of a predetermined amount of time (e.g., 10 minutes) without receiving any input from the user on the client device 100, the user logging out of the mobile application or desktop application on the client device 100, etc. Note that if no event has occurred to terminate the virtual chat communication session, then the virtual chat communication session will continue. Should, in illustrated decision block 514, it be determined that the virtual chat communication session is terminated, then the computer-executable program code may instruct the one or more processors 210 to close the virtual chat communication session processes, and the virtual chat communication session would no longer require resources by the financial institution server(s) 200. Should, in illustrated decision block 514, it be determined that the virtual chat communication session has not been terminated, then the computer-implemented method 500 returns to illustrated process block 506.

In accordance with one or more embodiments described herein, a user can engage in multiple virtual chat communication sessions in parallel (i.e., contemporaneously or simultaneously) with different virtual support agents (human or automated) from a financial institution. This can be advantageous because the user may have separate issues to discuss, and while the user is waiting for a response from one virtual support agent, may engage in another virtual chat communication session another virtual support agent to discuss another issue. Executing multiple virtual chat communication sessions in parallel can also be advantageous in that the user can separate different issues into different respective virtual chat communication sessions, avoiding potential confusion of using a single virtual chat communication session to address different issues. Using multiple virtual chat communication sessions can also be advantageous because a user may have one complex issue which requires a human virtual support agent while also having a simple issue which could be addressed by a virtual agent, so utilizing separate virtual chat communication sessions for each (one session with a human virtual support agent and one session with a virtual agent) would preserve resources at the financial institution.

As illustrated in FIG. 6, a computer-implemented method 600 can execute a virtual chat communication session between a user and a human virtual support agent, in accordance with one or more embodiments set forth and described herein. Illustrated process blocks 602 and 604 can be implemented the same as illustrated process blocks 502 and 504, respectively, from FIG. 5.

In illustrated process block 606, the virtual chat communication session for the user is matched with a human virtual support agent. The financial institution may have one or more human virtual support agents having access to the financial institution server(s), and whom have their own client device to facilitate communication with the user via a virtual chat communication session. The computer-executable program code may instruct the one or more processors 210 to match the virtual chat communication session with one of the plurality of human virtual support agents. The matching can be executed randomly, or a human virtual support agent can be selected based on certain criteria (e.g., linguistically compatible with a detected language used by the user, specialized knowledge and/or experience in the financial service being requested by the user, etc.)

The computer-implemented method 600 may then proceed to illustrated process block 608, which is typically performed the same as illustrated process block 506 from FIG. 5.

The computer-implemented method 600 may then proceed illustrated process block 610, which includes transmitting the text received from the virtual chat communication session in illustrated process block 608 to the matched human virtual support agent for this respective virtual chat communication session, typically via the one or more financial institution server(s) 200.

The computer-implemented method 600 may then proceed to illustrated process block 612, in which the human virtual support agent textually or verbally communicates a response (the human virtual support agent could first conduct research of data/information stored in a storage location of the one or more financial institution servers 200), which is routed by the one or more processors 210 for display on the user interface 131a, 131b of the client device 100.

The computer-implemented method 600 may then proceed to decision block 614, which determines whether the virtual chat communication session is terminated. This can be done identically to illustrated decision block 514 from FIG. 5. Should it be determined that the virtual chat communication session is terminated, then the chat window visually displayed on the user interface 131a, 131b of the client device 100 is closed (for this particular chat only, any remaining chats would still be active and visually displayed). Should it be determined that the virtual chat communication session is not terminated, the computer-implemented 600 would return to illustrated process block 608.

Figure 7:
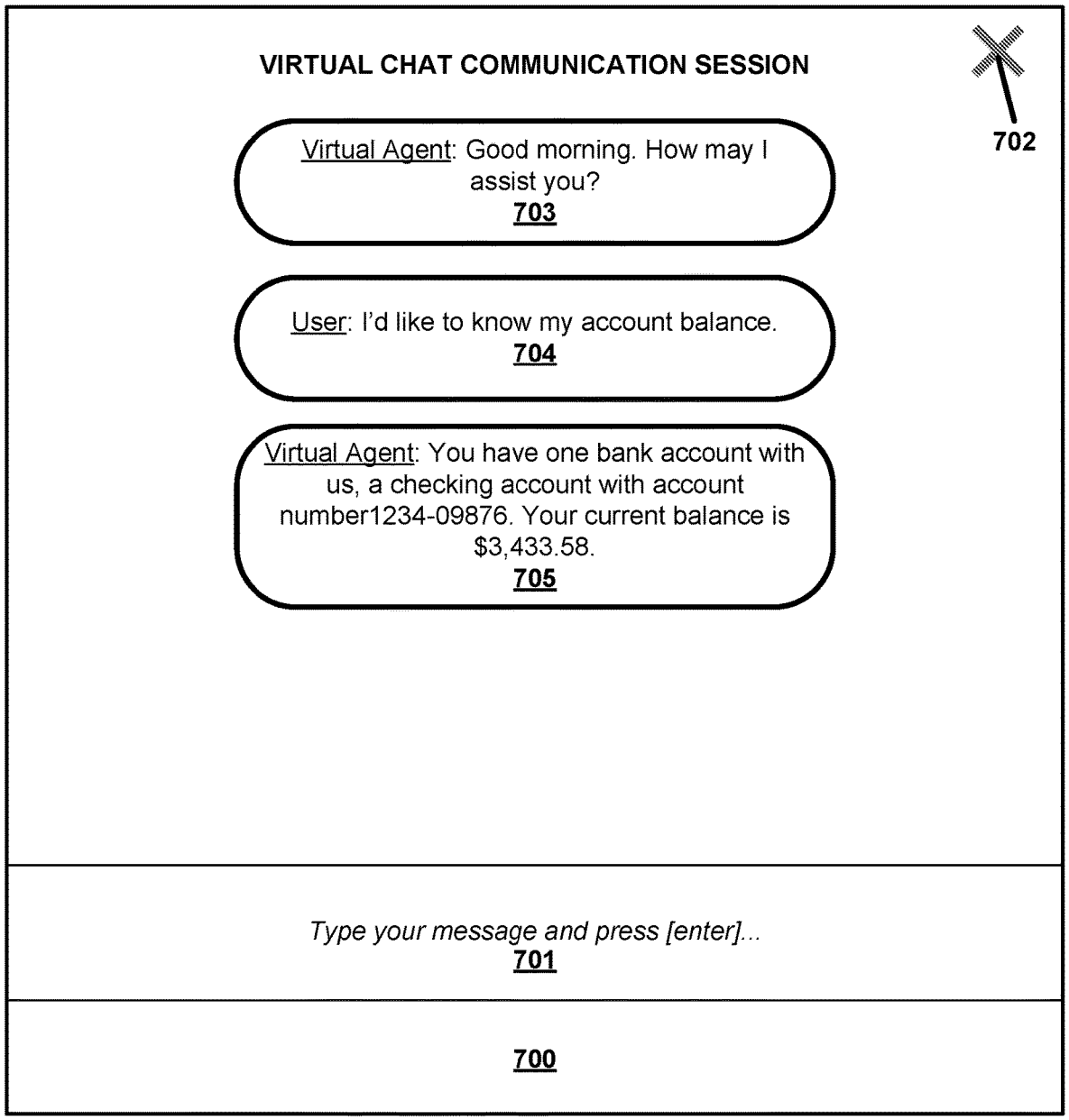
FIG. 7 illustrates a virtual chat communication session between a user and a virtual support agent, in accordance with one or more embodiments set forth and described herein.

As illustrated in FIG. 7, upon a user launching a financial institution mobile application or desktop application on the client device 100, and being authenticated by the user authentication module 221, the computer-executable program code may instruct the one or more processors 210 to cause a display of a GUI on the user interface 131a, 131b of the client device 100. The GUI comprises a chat interface (e.g., a chat window) 700 that facilitates a virtual chat communication session (e.g., a textual chat or a verbal chat) with a virtual support agent that comprises a plurality of chat messages 703 through 705. During the virtual chat communication session, the user may transmit a message 704 comprising a general request for information. The computer-executable program code may instruct the one or more processors 210 to analyze the request 704, and query the financial institution server(s) 200 for an answer to the inquiry 704 and respond by transmitting a message 705 providing information that was requested by the client device 100. In particular, in response to receipt of the user request 703 for information, the computer-executable program code may instruct the one or more processors 210 to cause a visual display of a message 705 on the chat interface on the user interface 131a, 131b of the client device 100. A chat box 701 is used for the user to type in the user's messages intended for the agent (e.g., queries, commands, etc.) which are then routed to the respective agent and the message is then also displayed as a message above the chat box 701.

Figure 8:
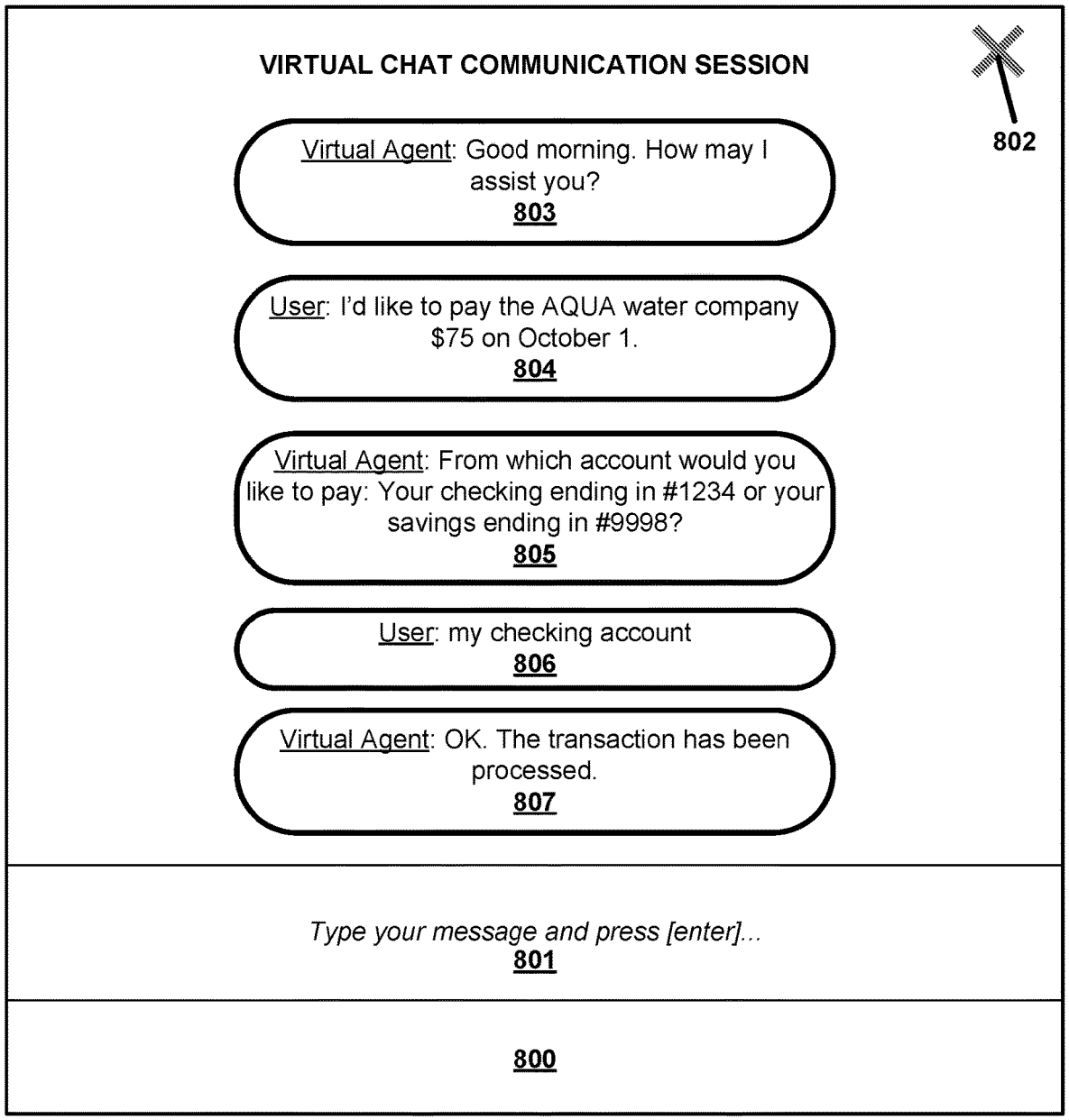
FIG. 8 illustrates a virtual chat communication session between a user and a virtual support agent implementing a financial transaction, in accordance with one or more embodiments set forth and described herein.

As illustrated in FIG. 8, a virtual chat communication session between a user and a virtual support agent implements a financial transaction, in accordance with one or more embodiments set forth and described herein. Using the chat box 801, the user may enter one or more textual commands. During the virtual chat communication session, the user issues a using natural language command to the virtual support agent in the virtual chat communication session to execute a bill payment to a payee (AQUA Water Company) for a specific amount ($75) on a specific date (October $1^{st}$). The virtual support agent (whether automated or human) may transmit a response in the form of chat message 805 prompting the user for additional information (e.g., from which financial account should the funds be used) that may be required in order to execute the bill. A payment transaction should comprise a payee, amount, paid from account, and date the transaction should be completed (unless the user desires to initiate the transaction immediately). The user may then, via the client device 100, respond to the prompt by providing the necessary information (chat message 801d).

Having all of the information needed to complete the financial transaction, the computer-executable program code may instruct the one or more processors 210 to complete the financial transaction by initiating a transfer of funds from the source financial account of the user to the specified payee. The computer-executable program code may instruct the one or more processors 210 to confirm the completion of the transaction is by transmitting a chat message 807. Note that the one or more financial servers 200 would typically store a list of payees (e.g., utility companies, etc.) and corresponding financial information (e.g., routing number, account number, etc.) necessary to execute a financial transaction to each respective payee. In addition, the one or more financial servers 200 may execute the financial transaction using the bill pay system of the financial institution. In that way, the necessary payee information can be used (or automatically populated should any such information be lacking) by the one or more financial servers 200.

Figure 9:
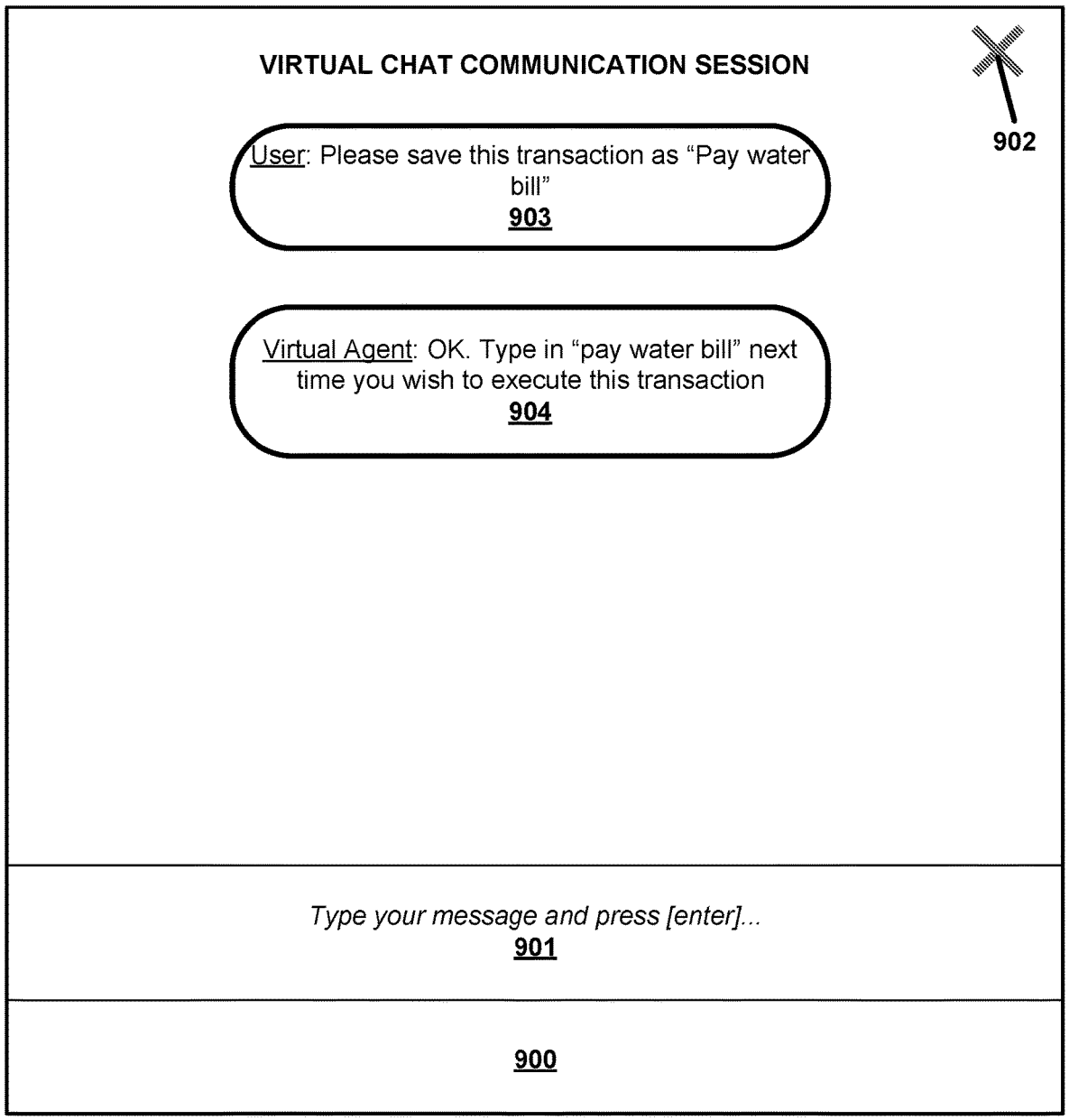
FIG. 9 illustrates a virtual chat communication session between a user and a virtual support agent saving the financial transaction, in accordance with one or more embodiments set forth and described herein.
Figure 10:
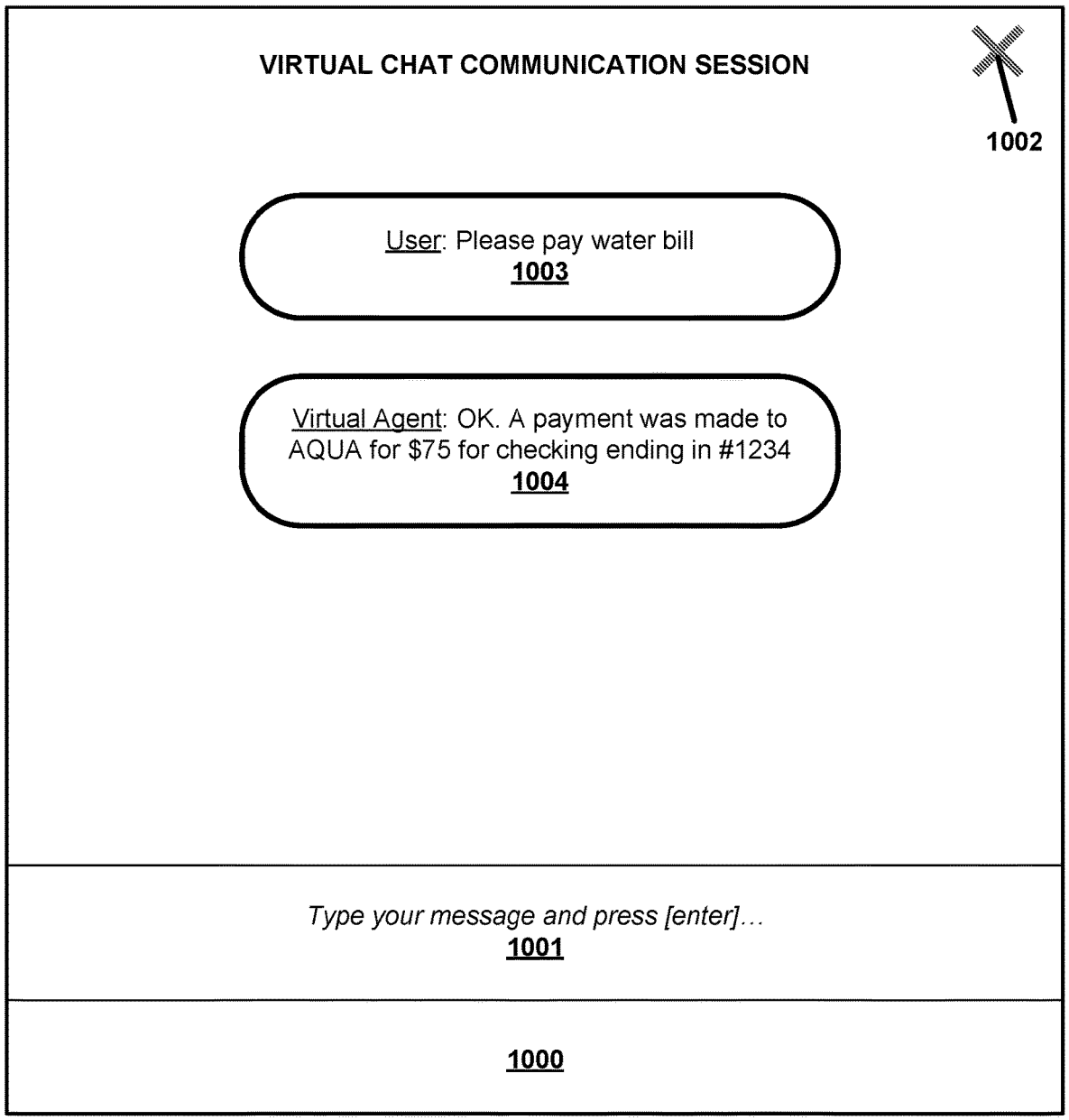
FIG. 10 illustrates a virtual chat communication session between a user and a virtual support agent issuing a command to execute a saved financial transaction, in accordance with one or more embodiments set forth and described herein.

As illustrated in FIG. 9, a virtual chat communication session between a user and a virtual support agent saving the financial transaction, in accordance with one or more embodiments set forth and described herein. In chat message 903, the user commands the virtual support agent to save the most recent financial transaction (illustrated in FIG. 8). The financial transaction would be stored in a storage location of the one or more financial institution servers 200, and assigned a user-designated name selected by the user that references the financial transaction. In response, the virtual support agent confirms via chat message 904 that the financial transaction was saved. The user can now command a future execution of the financial transaction by referencing the user-designated name, as illustrated in FIG. 10. The financial transaction comprising the transaction details (amount of $75, 'pay from account' is checking account ending in 1234, the payee is AQUA) associated with the user-designated name "pay water bill" is now saved (see illustrated process block 1105 from FIG. 11) in the one or more financial servers 200 and can be utilized (see illustrated process blocks 1106 and 1107 from FIG. 11) by the user's financial account (but not accessible by other customers having different accounts).

As illustrated in FIG. 10, during another virtual chat communication session that occurs in the future, the user may transmit a chat message 1003 comprising a command to execute the transaction again. In response thereto, the computer-executable program code may instruct the one or more processors 210 to retrieve the details of the respective financial transaction from the storage location of the one or more financial institution servers 200, and execute the financial transaction. In response to executing the financial transaction, the computer-executable program code may instruct the one or more processors 210 to transmit a chat message 1004 confirming execution of the financial transaction. When the financial transaction is implemented, the details of the financial transaction would be transmitted to an software application executing on the one or more financial institution servers 200, which would actually execute the financial transaction by accessing the user's financial account on the financial institution servers 200.

Figure 11:
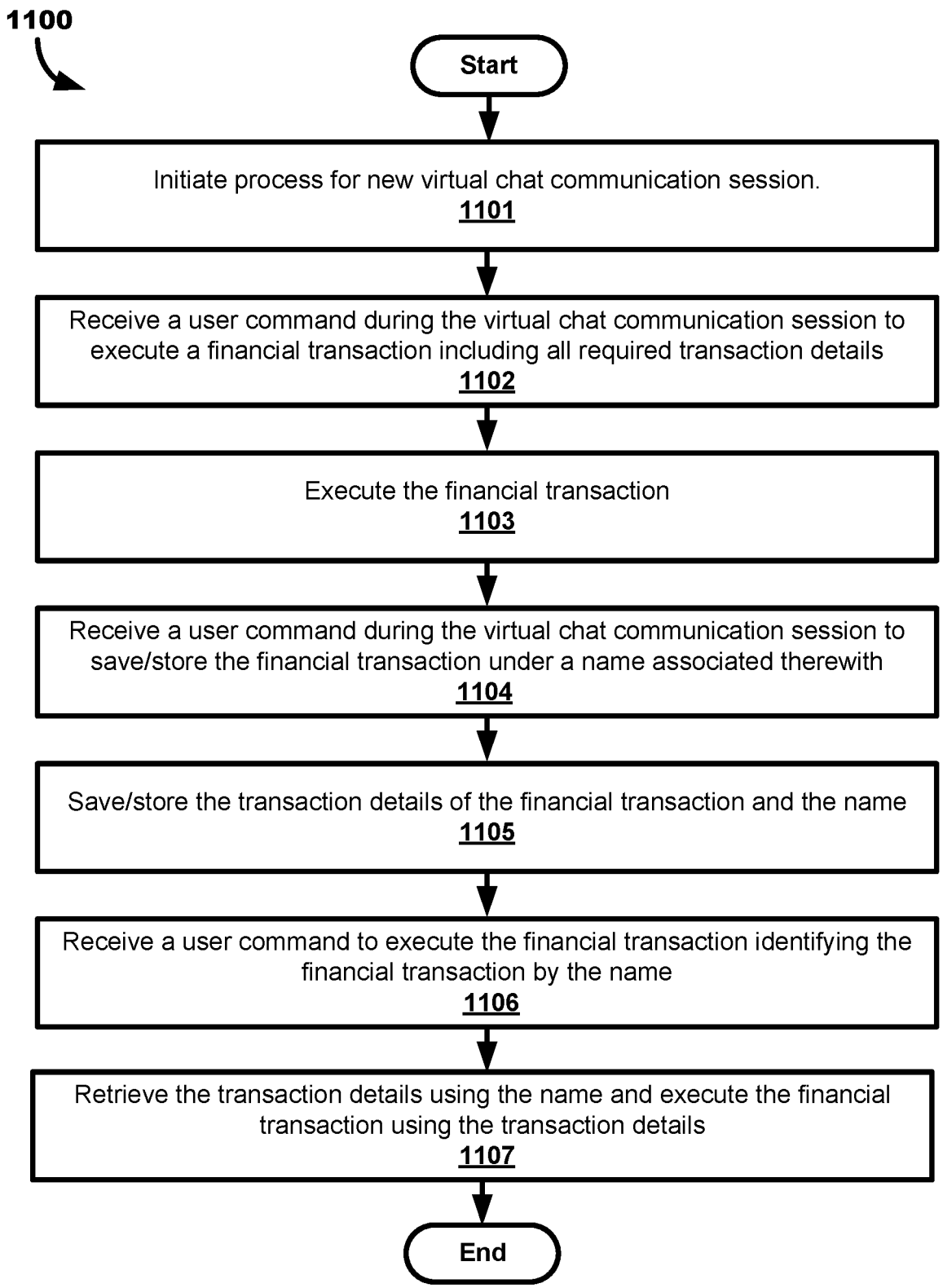
FIG. 11 illustrates a computer implemented method for saving and implementing a financial transaction, in accordance with one or more embodiments set forth and described herein.
Figure 12:
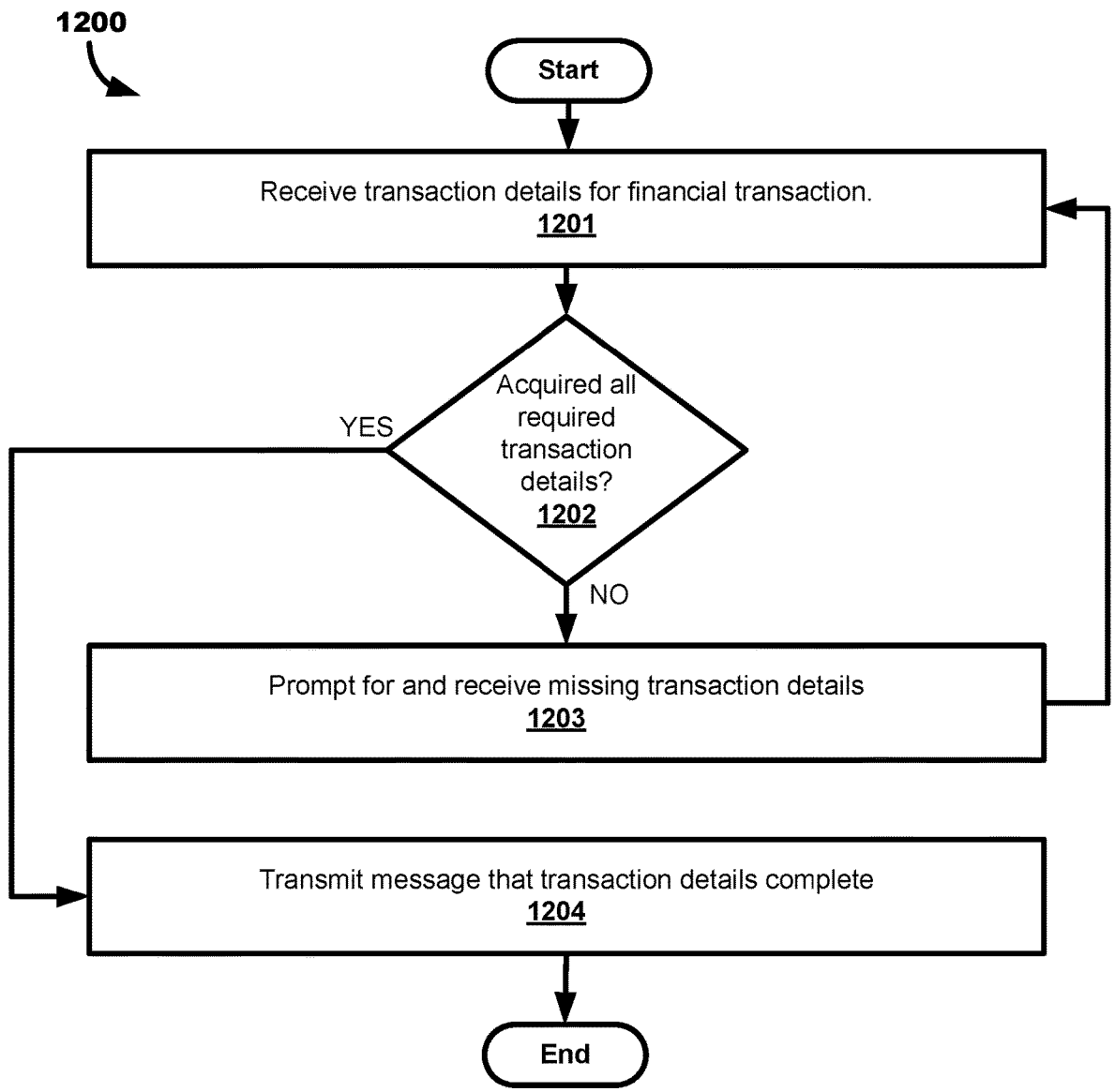
FIG. 12 illustrates a computer implemented method for obtaining transaction data for a financial transaction, in accordance with one or more embodiments set forth and described herein.
Figure 13:
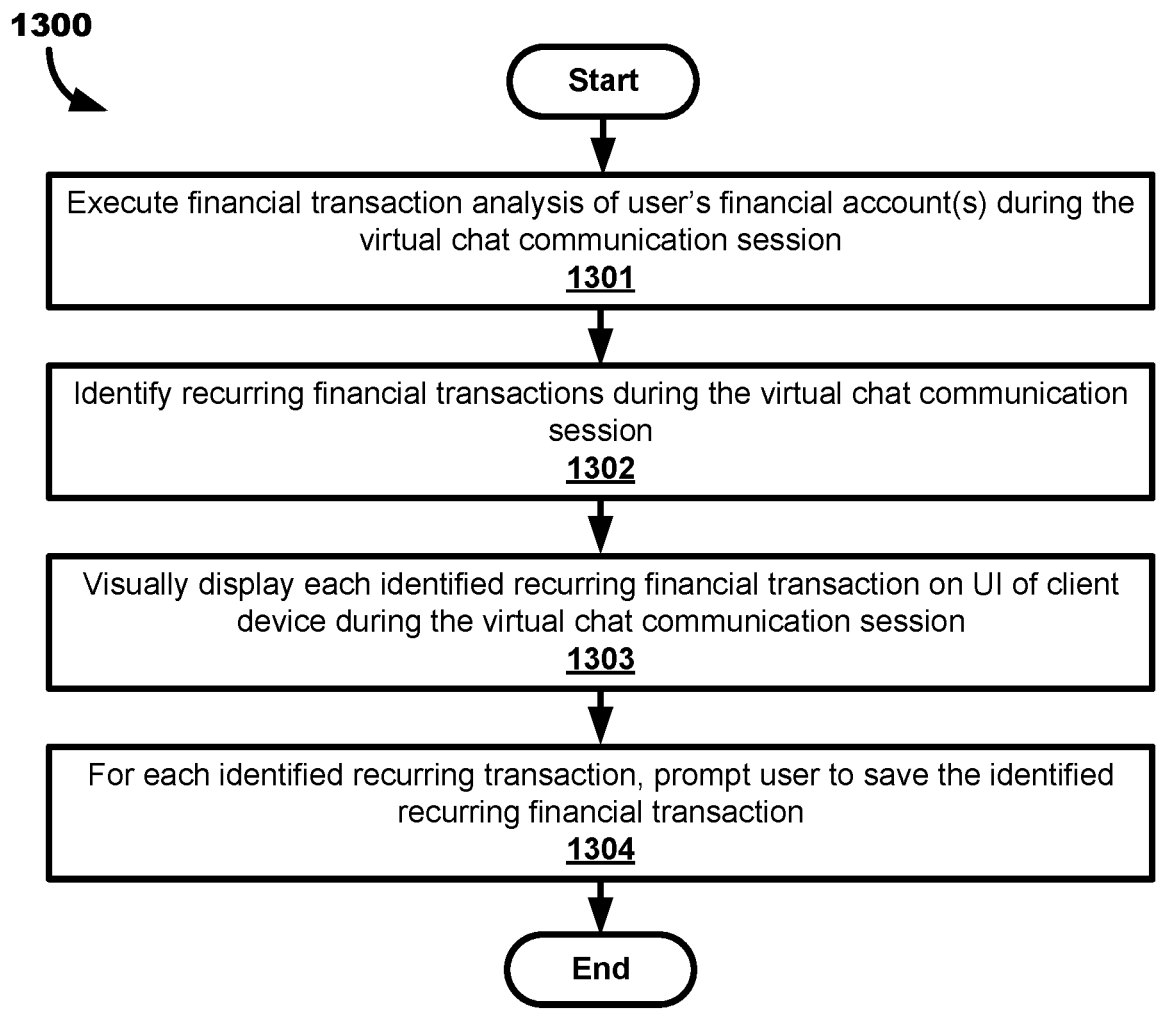
FIG. 13 illustrates a computer implemented method for automatically prompting the user to save recurring transactions, in accordance with one or more embodiments set forth and described herein.

Illustrated example shown in FIGS. 11 through 13 set forth computer-implemented methods 1100, 1200, and 1300. In one or more examples, the respective flowcharts of the computer-implemented methods 1100, 1200, and 1300 may be implemented by the one or more processors 210 of the one or more financial institution servers 200. In particular, the computer-implemented methods 1100, 1200, and 1300 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

FIG. 11 illustrates a computer-implemented method 1100 for saving and implementing a financial transaction during a virtual chat communication session, in accordance with one or more embodiments set forth and described herein.

In illustrated process block 1101, a new virtual chat communication session is initiated or is already in progress (this can be accomplished as described herein). The method may proceed to illustrated process block 1102, which receives from a command from a user in the virtual chat communication session to execute a financial transaction including transaction details. For example, the user can type in (using natural language) transaction details such as the amount to pay, the payee, the date to effectuate the transaction, the user's account to draw the funds from, and any other such information. The command can take the form of "Please pay [payee name] $75 from my checking account today" or any similar such natural language phrase. The required transaction details will be necessary (which can be obtained using the method as illustrated in FIG. 12) before the computer-implemented method 1100 can proceed to illustrated process block 1103.

Should the required transaction details be provided, the computer-implemented method 1100 can then proceed to illustrated process block 1103, which implements or otherwise executes the financial transaction. The financial transaction can be executed by utilizing an API (application programming interface) supported by the one or more financial institution servers 200, which can use library functions to perform functions in real time, such as fund transfers, wires, bill pay (ACH, check, electronic funds transfer, etc.) or other such functions.

The computer-implemented method 1100 can then proceed to illustrated process block 1104, which includes receiving a user command temporally after execution of the financial transaction and during the virtual chat communication session, to save or otherwise store the financial transaction (and the transaction details) in the storage location of the one or more financial institution servers 200 in order that it may be executed again at some later date designated by the user. For example, should the financial transaction be a classified as a recurring transaction that occurs periodically (e.g., monthly), the transaction details can be saved by user request or command in order to have the financial transaction executed in the future. The command can be in natural language such as 'save the last transaction as "pay water bill."

The computer-implemented method 1100 can then proceed to illustrated process block 1105, which saves/stores the transaction details of the financial transaction and the user-designated name (provided by the user) in the storage location of the one or more financial institution servers 200. In this way, the financial transaction can be stored so that the user can repeat the financial transaction easily without going through the necessity of typing in the transaction details manually.

The computer-implemented method 1100 can then proceed to illustrated process block 1106, which receives, during a virtual chat communication session temporally after (e.g., minutes, hours, days, weeks, years, etc.) storing the financial transaction and the user-designated name, a user command to execute the financial transaction again. The user can identify the financial transaction by communicating the user-designated name (textually or verbally) during the virtual chat communication session (e.g., "pay water bill").

There can be any number (e.g., 1 to 100 or more) of stored financial transactions that the user can utilize during any given time. Note that each user would only have access to the user's personal financial transactions which would be associated with the user's financial account maintained at the financial institution.

The computer-implemented method 1100 can then proceed to illustrated process block 1107, which retrieves the transaction details associated with the user-designated name (from illustrated process block 1106) and executes the financial transaction using the transaction details. In this manner, the user would not have to manually retype in all of the transaction details each time the user wanted to execute the financial transaction, which would save the user time.

FIG. 12 illustrates a computer-implemented method 1200 for obtaining transaction data for a financial transaction during a virtual chat communication session, in accordance with one or more embodiments set forth and described herein.

In illustrated process block 1201, the transaction details are received/acquired from the client device 100 of the user. The user typically types in the transaction details using natural language.

The computer-implemented method 1200 then proceeds to illustrated decision block 1202, which determines whether all of the required transaction details are obtained. A list of required transaction details is maintained, for example payee name, transaction amount, source account, date of transaction, etc.

Should the answer be "No," i.e., it is determined that all of the required transaction details have not been obtained, then the computer-implemented method 1200 proceeds to illustrated process block 1203, which prompts the user to provide the missing transaction details. For example, the user not identify the source account, the virtual support agent can transmit a message to the user in the chat window requesting that the source account be provided. The method can return to illustrated decision block 1202 which continues to determine whether all of the required transaction details are obtained.

Should the answer be "Yes," then the computer-implemented method 1200 proceeds to illustrated process block 1204 which transmits a chat message that the transaction details are all complete.

FIG. 13 illustrates a computer-implemented method 1300 for automatically prompting the user to save recurring transactions during a virtual chat communication session, in accordance with one or more embodiments set forth and described herein. As a convenience to the user, recurring transactions can be automatically identified so that they can be easily saved as a financial transaction.

The computer-implemented method 1300 can begin with illustrated process block 1301, which includes executing, during the virtual chat communication session, financial transaction analysis of the user's financial accounts maintained by the financial institution to identify one or more recurring financial transactions. The transaction history of each financial account is stored in a storage location of the financial institution servers 200. The one or more processors 210 of the one or more financial institution servers 200 have access to the storage location of the financial account(s) of the user.

The computer-implemented method 1300 can then proceed to illustrated process block 1302, which includes identifying, during the virtual chat communication session, any recurring financial transactions. Recurring transactions can be identified by looking for transactions on different days that have the same fields, such as the same payee, transaction amount, etc. When a financial transaction has the same payee, same amount, and same source financial account, but occurring on a different date (e.g., one month apart), that financial transaction can be identified as a recurring transaction.

After all such recurring transactions have been identified, the computer-implemented method 1300 can then proceed to illustrated process block 1303, which includes causing, during the virtual chat communication session, the visual display of each identified recurring financial transaction on the UI 131*a*, 131*b* of the client device 100.

The computer-implemented method 1300 can then proceed to illustrated process block 1304, which includes prompting the user to save each of identified recurring financial transactions in the storage location of the one or more financial institution servers 200. Should the user intend to save an identified recurring financial transaction, then the transaction details (all of the fields) would be saved in the storage location of the one or more financial institution servers 200, including a user-designated name to be associated of the financial transaction. The user can be prompted to input a user-designated name for each recurring transaction (e.g., "Pay electric bill') so that the user can simply cause the recurring transaction to be executed by simply transmitting a command that references the user-designated name during the virtual chat communication session (as described herein).

Figure 14:
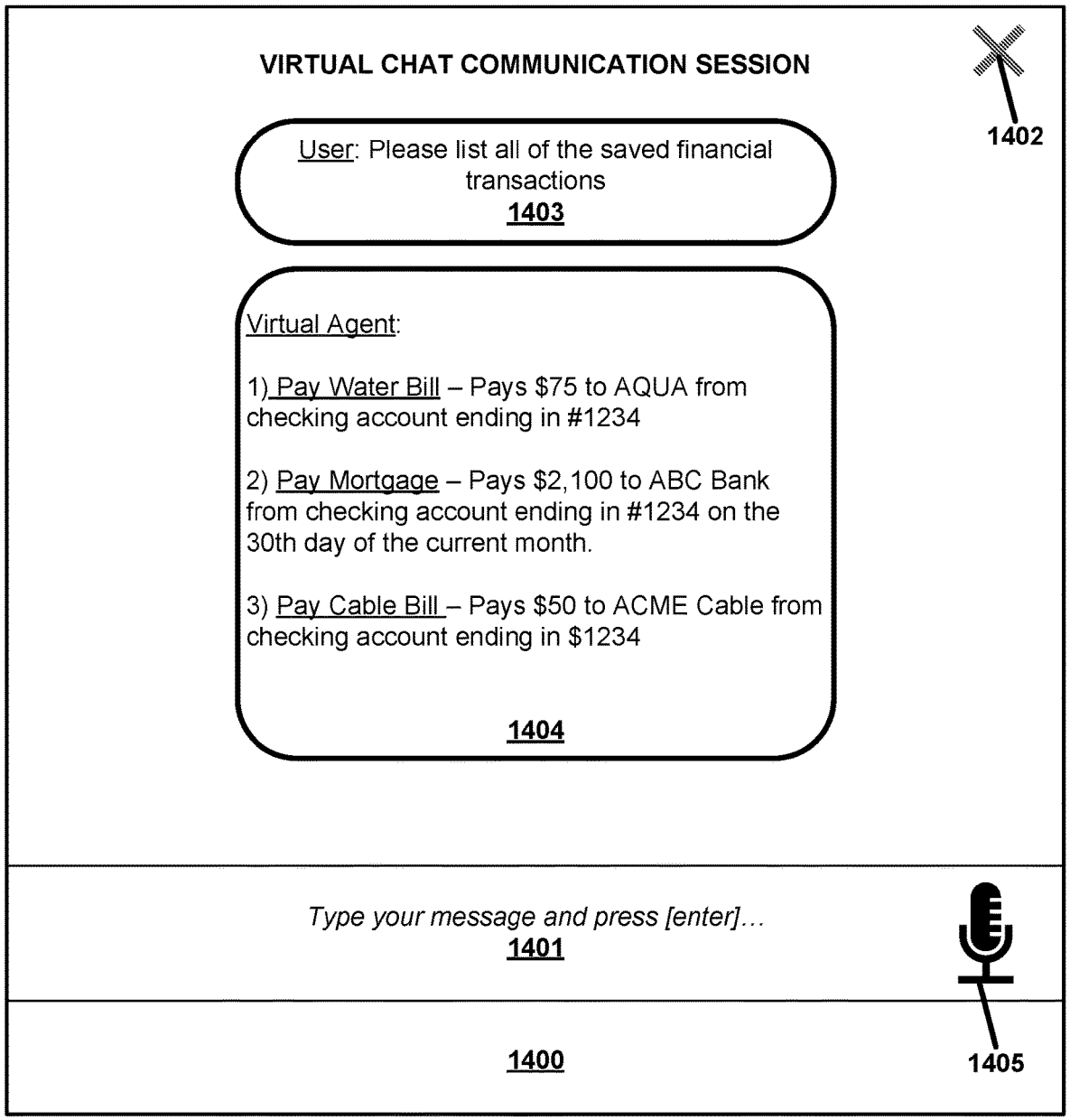
FIG. 14 illustrates a virtual chat communication session between a user and a virtual support agent displaying a list of stored financial transactions, in accordance with one or more embodiments set forth and described herein.

As illustrated in FIG. 14, a virtual chat communication session between a user and a virtual support agent visually displays a list of saved or stored financial transactions, in accordance with one or more embodiments set forth and described herein. Using the chat box 1401, the user can transmit a command during the virtual chat communication session in the form of a chat message 1403 to list all saved or stored financial transactions. In response to the user command, the computer-executable program code may instruct the one or more processors 210 to cause a visual display of a chat message 1404 on the user interface 131*a*, 131*b* of the client device 100, the chat message 1404 including a list of all stored recurring financial transactions, including their respective names (e.g., underlined) and the corresponding transaction details. Note that a user-engageable microphone icon 1405 can optionally be present anywhere in the chat window 1400 (and any other chat window). The microphone icon 1405, when engaged or manipulated by the user, enables the user to verbally speak his/her inputs instead of typing them into the chat box 1401. Verbal/audio inputs would automatically appear as text being typed into the chat box 1405 as if it were typed. Some users may prefer to speak their text as opposed to typing since speaking text may save time over typing.

In accordance with one or more embodiments set forth, described, and/or illustrated herein, the client device 100 and the one or more financial institution servers 200 could function in a fully virtualized environment. A virtual machine is where all hardware is virtual and the operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software executing on hardware platform, and one or more virtual machines executing on hardware platform by way of virtualization software. Virtualization software is therefore logically interposed between the physical hardware of hardware platform and guest system software executing "in" virtual machine.

Memory of the hardware platform may store virtualization software and guest system software executing in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for a long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in query, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A server computing system, comprising:
    a machine learning (ML) module including one or more ML algorithms;
    an application programming interface (API);
    one or more processors; and
    a non-transitory memory coupled to the one or more processors, the non-transitory memory including a set of instructions of computer-executable program code, which when executed by the one or more processors, causes the one or more processors to perform operations including:
    storing a first financial transaction of a user as user financial account data in a storage location;
    training, via the one or more ML algorithms based on the stored user financial account data, one or more machine learning models to identify a financial transaction as a recurring financial transaction;
    receiving, from a client device of a user contemporaneously with a virtual chat communication session between the user and a virtual support agent, a user command to execute a second financial transaction on behalf of the user using funds from a source financial account of the user, the financial transaction including transaction details that include one or more of a payee name, a transaction amount, a source financial account of the user, and a date of completion of the second financial transaction;
    identifying, via the trained one or more machine learning models based on the transaction details, the second financial transaction as a recurring financial transaction; and
    executing, via the API contemporaneously with the virtual chat communication session, the second financial transaction using the transaction details.

2. The server computing system of claim 1, wherein the set of instructions, which when executed by the one or more processors, causes the one or more processors to perform operations including:
    receiving, from the client device contemporaneously with the virtual chat communication session, a second user command to save a user-designated name associated with the second financial transaction and classify the financial transaction as a recurring financial transaction to be executed automatically on a predetermined time period using the user-designated name and the transaction details; and
    saving, in response to the second user command, save the user-designated name and classifying the financial transaction as the recurring financial transaction.

3. The server computing system of claim 1, wherein the set of instructions, which when executed by the one or more processors, causes the one or more processors to perform operations including executing the financial transaction using an online bill payment system of the financial institution.

4. The server computing system of claim 3, wherein the set of instructions, which when executed by the one or more processors, causes the one or more processors to perform operations including automatically populating input fields of the online bill payment system using the transaction details.

5. The server computing system of claim 1, wherein the set of instructions, which when executed by the one or more processors, causes the one or more processors to perform operations including visually displaying, contemporaneously with the virtual chat communication session, all saved financial transaction details and their respective user-designated name.

6. A computer program product comprising at least one non-transitory computer readable medium having with a set of instructions of computer-executable program code, which when executed by one or more processors of a server computing system, causes the server computing system to perform operations including:
storing a first financial transaction of a user as user financial account data in a storage location;
training, via one or more ML algorithms of a machine learning (ML) module based on the stored user financial account data, one or more machine learning models to identify a financial transaction as a recurring financial transaction;
receiving, from a client device of a user contemporaneously with a virtual chat communication session between the user and a virtual support agent, a user command to execute a second financial transaction on behalf of the user using funds from a source financial account of the user, the financial transaction including transaction details that include one or more of a payee name, a transaction amount, a source financial account of the user, and a date of completion of the second financial transaction;
identifying, via the trained one or more machine learning models based on the transaction details, the second financial transaction as a recurring financial transaction; and
executing, via an application programming interface (API) of the server computing system contemporaneously with the virtual chat communication session, the second financial transaction using the transaction details.

7. The computer program product of claim 6, wherein the set of instructions, which when executed by the one or more processors, causes the server computing system to perform operations including:
receiving, from the client device contemporaneously with the virtual chat communication session, a second user command to save a user-designated name associated with the second financial transaction and classify the financial transaction as a recurring financial transaction to be executed automatically on a predetermined time period using the user-designated name and the transaction details; and
saving, in response to the second user command, save the user-designated name and classifying the financial transaction as the recurring financial transaction.

8. The computer program product of claim 6, wherein the set of instructions, which when executed by the one or more processors, causes the server computing system to perform operations including executing the financial transaction using an online bill payment system of the financial institution.

9. The computer program product of claim 8, wherein the set of instructions, which when executed by the one or more processors, causes the server computing system to perform operations including automatically populating input fields of the online bill payment system using the transaction details.

10. The computer program product of claim 6, wherein the set of instructions, which when executed by the one or more processors, causes the server computing system to perform operations including visually displaying, contemporaneously with the virtual chat communication session, all saved financial transaction details and their respective user-designated name.

11. A computer-implemented method implemented by a server computing system, the computer-implemented method comprising:
storing a first financial transaction of a user as user financial account data in a storage location;
training, via one or more ML algorithms of a machine learning (ML) module based on the stored user financial account data, one or more machine learning models to identify a financial transaction as a recurring financial transaction;
receiving, from the client device of a user contemporaneously with a virtual chat communication session between the user and a virtual support agent, a user command to execute a second financial transaction on behalf of the user using funds from a source financial account of the user, the financial transaction including transaction details that include one or more of a payee name, a transaction amount, a source financial account of the user, and a date of completion of the second financial transaction;
identifying, via the trained one or more machine learning models based on the transaction details, the second financial transaction as a recurring financial transaction; and
executing, via an application programming interface (API) of the server computing system contemporaneously with the virtual chat communication session, the second financial transaction using the transaction details.

12. The computer-implemented method of claim 11, further comprising:
receiving, from the client device contemporaneously with the virtual chat communication session, a second user command to save a user-designated name associated with the second financial transaction and classify the financial transaction as a recurring financial transaction to be executed automatically on a predetermined time period using the user-designated name and the transaction details; and
saving, by the one or more financial institution servers in response to the second user command, save the user-designated name and classifying the financial transaction as the recurring financial transaction.

13. The computer-implemented method of claim 11, further comprising executing the financial transaction using an online bill payment system of the financial institution.

14. The computer program product of claim 13, further comprising automatically populating input fields of the online bill payment system using the transaction details.

* * * * *